United States Patent  
Gu et al.

(10) Patent No.: US 12,373,464 B1
(45) Date of Patent: Jul. 29, 2025

(54) METHODS TO SYNCHRONOUSLY REPLICATE DATA AND MANAGE AUDIT CONFIGURATION AND AUDIT DATA FOR A DISTRIBUTED STORAGE SYSTEM

(71) Applicant: NetApp, Inc., San Jose, CA (US)

(72) Inventors: Wenqing Gu, Burnaby (CA); Kedar Narayan Deshpande, Sunnyvale, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/423,595

(22) Filed: Jan. 26, 2024

(51) Int. Cl.
*G06F 7/00* (2006.01)
*G06F 11/14* (2006.01)
*G06F 16/23* (2019.01)
*G06F 16/27* (2019.01)
*G06F 16/28* (2019.01)

(52) U.S. Cl.
CPC ........ *G06F 16/275* (2019.01); *G06F 11/1402* (2013.01); *G06F 16/2365* (2019.01); *G06F 16/285* (2019.01)

(58) Field of Classification Search
CPC .. G06F 16/275; G06F 16/285; G06F 16/2365; G06F 11/1402
USPC .................................................. 707/600–899
See application file for complete search history.

(56) References Cited

U.S. PATENT DOCUMENTS

| 11,573,866 | B2 | 2/2023 | Dwarampudi et al. |
| 2021/0019067 | A1 | 1/2021 | Miller et al. |
| 2023/0032714 | A1 | 2/2023 | Pandit et al. |
| 2023/0147671 | A1 | 5/2023 | Narulkar et al. |
| 2023/0394064 | A1* | 12/2023 | Chipman ............ G06F 16/2365 |
| 2024/0396894 | A1 | 11/2024 | Fisher et al. |

OTHER PUBLICATIONS

Non-Final Office Action mailed on May 6, 2025 for U.S. Appl. No. 18/423,588, filed Jan. 26, 2024, 10 pages.

* cited by examiner

*Primary Examiner* — Isaac M Woo
(74) *Attorney, Agent, or Firm* — Jaffery Watson Hamilton & DeSanctis LLP

(57) ABSTRACT

In one embodiment, a computer implemented method includes comprises storing objects in a first bucket and files in a second bucket of a first storage cluster of the distributed storage system, initiating an audit job on the first storage cluster, synchronously replicating audit configuration data and mirroring audit data (e.g., audit files, logs) from the first storage cluster to the second storage cluster, performing a switchover process from the first storage cluster to the second storage cluster, and initiating an audit job on the second storage cluster based on the audit configuration during the switchover process. The first storage cluster initially handles input/output operations for a software application before the switchover process.

20 Claims, 10 Drawing Sheets

US 12,373,464 B1

METHODS TO SYNCHRONOUSLY REPLICATE DATA AND MANAGE AUDIT CONFIGURATION AND AUDIT DATA FOR A DISTRIBUTED STORAGE SYSTEM

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright @ 2024, NetApp, Inc.

CROSS-REFERENCE TO RELATED APPLICATIONS

Not applicable.

FIELD

Various embodiments of the present disclosure generally relate to multi-site distributed data storage systems. In particular, some embodiments relate to methods to synchronously replicate data and manage audit configuration and audit data in distributed storage systems.

BACKGROUND

Multiple storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units.

Clients may store content in a distributed storage system. For example, a client may store thousands, millions, or billions of storage objects (also referred to as "objects") in the distributed storage system. Objects may be identified by their names, and the distributed storage system may also store object names of the objects. As the number of objects stored in the distributed storage system continues to grow, it may be difficult to store and access the objects in an efficient manner, particularly in case of a failure.

SUMMARY

In one embodiment, a computer implemented method includes storing objects in a first bucket and storing files in a second bucket of a first storage cluster of the distributed storage system, synchronously replicating data of the objects from the first bucket into a third mirrored bucket of a second storage cluster of the distributed storage system, synchronously replicating data of the files from the second bucket into a fourth mirrored bucket of the second storage cluster, synchronously replicating OSP configuration data from the first storage cluster to the second storage cluster during the synchronous replication, and providing business continuity, non-disruptive operations with zero recovery time objective (RTO), and ensuring consistency between the objects in the first bucket and the objects in the third bucket for a software application that is accessing one or more objects and files using the OSP. The objects and files are accessible through an object storage protocol (OSP).

Some embodiments relate to a computer implemented method performed by one or more processing resources of a distributed object storage database. The method comprises storing objects in a first bucket and files in a second bucket of a first storage cluster of the distributed storage system, initiating an audit job on the first storage cluster, synchronously replicating audit configuration data and mirroring audit data (e.g., audit files, logs) from the first storage cluster to the second storage cluster, performing a switchover process from the first storage cluster to the second storage cluster, and initiating an audit job on the second storage cluster based on the audit configuration during the switchover process. The first storage cluster initially handles input/output operations for a software application before the switchover process.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
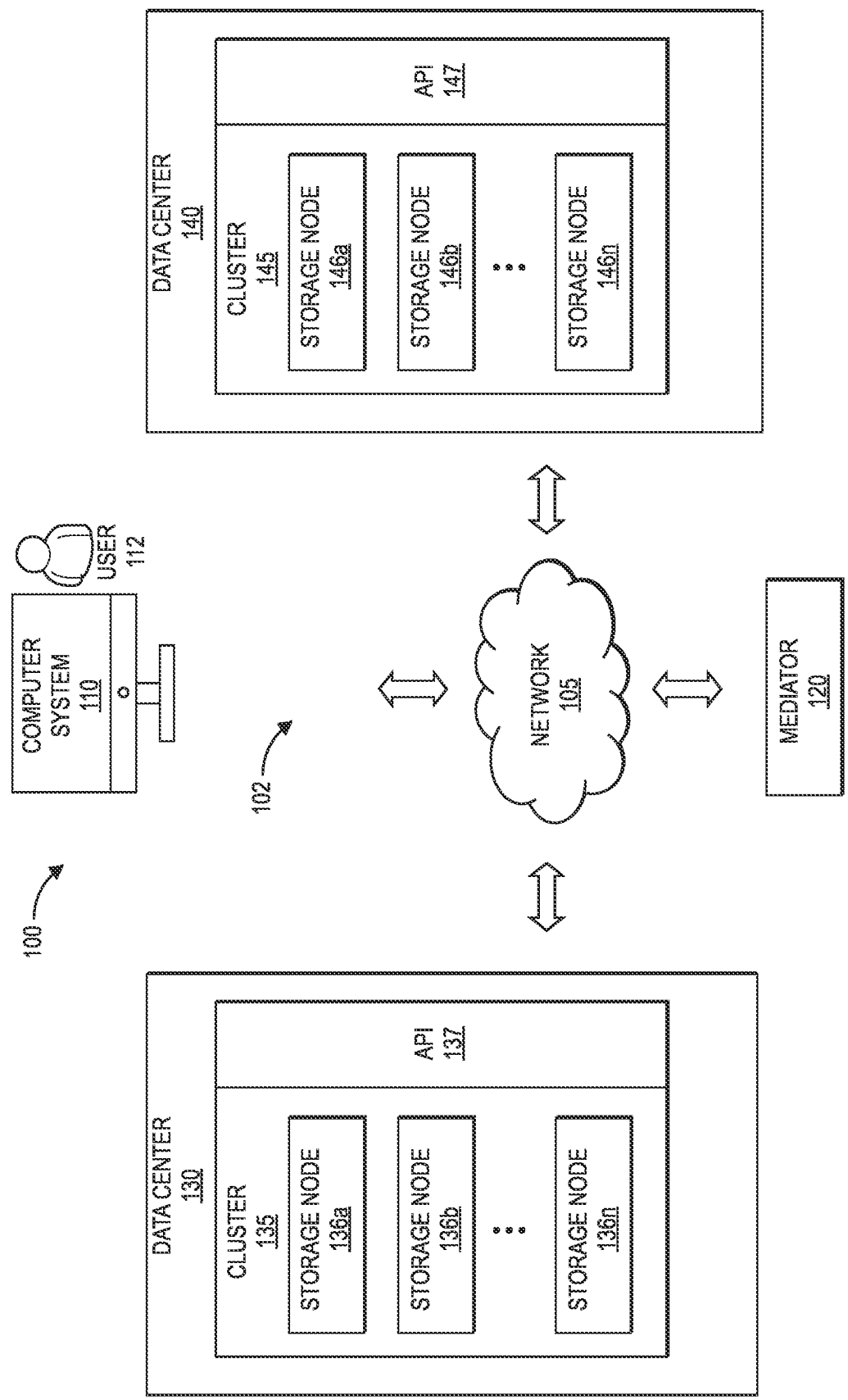
FIG. 1 is a block diagram illustrating an environment in which various embodiments may be implemented.

In one example, an operating system of a distributed storage system allows creation of object storage buckets on a primary storage site and a mirrored aggregate storage of a secondary storage site. The distributed storage system replicates object storage configuration data from a primary storage cluster of a primary storage site to a secondary storage cluster of the secondary storage site, which provides disaster recovery in case of a failure. When a switchover state occurs due to a failure, applications will seamlessly resume access to an identical copy of the same object storage bucket on the secondary storage site without experiencing any visible disruption or requiring manual intervention. All users and user groups, policies, certificates, options, and other configuration will appear identical to the application on the secondary storage site.

The distributed storage system interfaces with multiple storage protocols including an object storage protocol (e.g., AMAZON S3® protocol support), Network attached storage (NAS) protocols (e.g., Network File System (NFS) protocol, Common Internet File System (CIFS) protocol, and the like), and a storage area network (SAN) protocol (e.g., Small Computer System Interface (SCSI), iSCSI, hyperSCSI, Fiber Channel Protocol (FCP)). Clients can use the object storage protocol (OSP) to create objects within a bucket, which may refer to a discrete container that stores a collection of objects, of the distributed storage system. Each such object is given a name, and the collective bucket is expected to be able to later retrieve an object by that name efficiently. Further, clients expect to be able to iterate the list of named objects at any time—starting at any name—and receive subsequent names in alphabetic sort order. Of particular note, these buckets are highly scalable, supporting hundreds of billions (or more) of objects. Therefore, a bucket of the present design essentially implements a database that stores all object names, in sorted order and optimized for fast lookup.

A prior approach for distributed object storage databases includes object storage not being synchronized from a primary storage site to a disaster recovery secondary storage site. Due to this restriction, object storage buckets may not be created on a mirrored aggregate storage of the secondary storage site when using this distributed storage platform, meaning that object data will not be protected by synchronous replication available for other types of data on this platform. As a result, in the event of a disaster for a distributed storage site, an application's access to object storage buckets will be disrupted, and data loss may occur.

Another prior approach provides an asynchronous mirroring and disaster recovery solution for OSP buckets. Although this prior approach can be configured with a low Recovery Point Objective (RPO), only synchronous disaster recovery can provide a true RPO of zero (no data loss), as acknowledgement is only sent to the application once data has been committed at both storage sites. Furthermore, although applications can be redirected to the destination bucket of the OSP mirroring relationship in the event of a disaster, this is a different bucket (i.e., containing none identical data, subject to RPO) with separate configuration and credentials. An administrator must make an additional effort to ensure that the configuration on the source and destination buckets is compatible in an attempt to reduce the length of an outage when redirecting applications in the event of a disaster. The replication of both data and configuration provided by support for OSP buckets on the platform of the present design eliminates delays due to data loss and configuration differences entirely. Prior approaches do not support such a zero-RPO business continuity solution of the present design for OSP object storage.

A storage solution of the present design can have strict service level agreements (e.g., RPO (recovery point objective)=0 and RTO (recovery time objective)=0 minutes) achieved through synchronous replication and seamless storage promotion to applications. However, object storage clients typically have longer timeouts and Hyperscalers typically don't have sync replication.

Embodiments described herein seek to improve various technological processes associated with cross-site storage solutions and ensure the process of efficiently replicating objects with aggregate mirroring and configuration data in a replication stream from a first storage cluster to a second storage cluster in the distributed storage system. Various embodiments of the present technology provide for a wide range of technical effects, advantages, and/or improvements to stretched storage systems and participating distributed storage systems. For example, various embodiments may include one or more of the following technical effects, advantages, and/or improvements. For the storage solution of the present design, synchronous replication of data is handled by aggregate mirroring. In order to replicate object storage configuration data efficiently to a disaster recovery site (e.g., a disaster recovery site), every operation that creates, modifies, or removes persistent configuration on the active primary storage site is added to a reliable replication stream and replayed on the disaster recovery site. This operation replay ensures that the same configuration is stored persistently on the disaster recovery site. These two replication mechanisms (e.g., data replication, configuration replication) are kept in sync to avoid inconsistency at the disaster recovery site in the event of a failure occurring during changes to configuration or data. All planned switchover and switchback operations are prevented while configuration changes are in the process of being replicated, and various tools are provided to repair any configuration inconsistencies in the event of an unplanned switchover during configuration replication. OSP buckets that contain Write-Once-Read-Many (WORM) data, as well as OSP buckets that support Network File System (NFS) and Common Internet File System (CIFS) access are also protected with this storage solution of the present design.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

FIG. 1 is a block diagram illustrating an environment 100 in which various embodiments may be implemented. In various examples described herein, an administrator (e.g., user 112) of a multi-site distributed storage system 102 having clusters 135 and cluster 145 or a managed service provider responsible for multiple distributed storage systems of the same or multiple customers may monitor various operations and network conditions of the distributed storage system or multiple distributed storage systems via a browser-based interface presented on computer system 110.

In the context of the present example, the multi-site distributed storage system 102 includes a data center 130, a data center 140, and optionally a mediator 120. The data centers 130 and 140, the mediator 120, and the computer system 110 are coupled in communication via a network 105, which, depending upon the particular implementation, may be a Local Area Network (LAN), a Wide Area Network (WAN), or the Internet.

The data centers 130 and 140 may represent an enterprise data center (e.g., an on-premises customer data center) that is owned and operated by a company or the data center 130 may be managed by a third party (or a managed service provider) on behalf of the company, which may lease the equipment and infrastructure. Alternatively, the data centers 130 and 140 may represent a colocation data center in which a company rents space of a facility owned by others and located off the company premises. The data centers are shown with a cluster (e.g., cluster 135, cluster 145). Those of ordinary skill in the art will appreciate additional IT infrastructure may be included within the data centers 130 and 140. In one example, the data center 140 is a mirrored copy of the data center 130 to provide non-disruptive operations at all times even in the presence of failures including, but not limited to, network disconnection between the data centers 130 and 140 and the mediator 120, which can also be located at a data center.

Turning now to the cluster 135, it includes multiple storage nodes 136a-n and an Application Programming Interface (API) 137. In the context of the present example, the multiple storage nodes 136a-n are organized as a cluster and provide a distributed storage architecture to service storage requests issued by one or more clients (not shown) of the cluster. The data served by the storage nodes 136a-n may be distributed across multiple storage units embodied as persistent storage devices, including but not limited to HDDs, SSDs, flash memory systems, or other storage devices. In a similar manner, cluster 145 includes multiple storage nodes 146a-n and an Application Programming Interface (API) 147. In the context of the present example, the multiple storage nodes 146a-n are organized as a cluster and provide a distributed storage architecture to service storage requests issued by one or more clients of the cluster.

The API 137 may provide an interface through which the cluster 135 is configured and/or queried by external actors (e.g., the computer system 110, data center 140, the mediator 120, clients). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration, storage efficiency metrics, and other system data) relating to the cluster 135 or components thereof. As those skilled in the art will appreciate various other types of telemetry data may be made available via the API 137, including, but not limited to measures of latency, utilization, and/or performance at various levels (e.g., the cluster level, the storage node level, or the storage node component level).

In the context of the present example, the mediator 120, which may represent a private or public cloud accessible (e.g., via a web portal) to an administrator associated with a managed service provider and/or administrators of one or more customers of the managed service provider, includes a cloud-based, monitoring system.

While for sake of brevity, only two data centers are shown in the context of the present example, it is to be appreciated that additional clusters owned by or leased by the same or different companies (data storage subscribers/customers) may be monitored and one or more metrics may be estimated based on data stored within a given level of a data store in accordance with the methodologies described herein and such clusters may reside in multiple data centers of different types (e.g., enterprise data centers, managed services data centers, or colocation data centers).

Network attached storage (NAS) protocols (e.g., Network File System (NFS) protocol, Common Internet File System (CIFS) protocol, and the like) organize content in terms of files and directories. A file is a collection of data or programs stored in a memory of a computer or on a storage device. A directory may contain both files and subdirectories, which may themselves contain files and subdirectories. Further, a root directory may contain the top level and indicate a NAS namespace. For example, a caller may reach any file by specifying the names of the series of directories (starting at the root) that lead to where the file's own name is kept, and then finally the filename itself leads to the content. Additionally, a caller may rename files and directories, essentially rearranging the namespace while leaving the content itself largely unchanged.

Object storage, on the other hand, may implement a different way of organizing its content. For example, an object storage environment typically does not contain directories or files. Instead, the object storage environment may include objects, and each object is given a name which is unique within the entire object namespace or a bucket, which may refer to a discrete container that stores a collection of objects. For example, object names do not contain any sort of implicit hierarchy. Objects function as units each behaving as self-contained repositories with metadata. Each object includes the object's content, the object's unique identifier, and the object's metadata. Each object exists in a bucket.

In one example, each of the storage nodes in FIG. 1 includes a plurality of volumes and each volume includes a plurality of buckets. In another example, the storage clusters provide a business continuity solution for files and objects on a single unified platform. One group of volumes provides an object store for objects and another group of volumes provides (NAS) protocols (e.g., Network File System (NFS) protocol, Common Internet File System (CIFS) protocol, and the like) to organize content in terms of files and directories.

Figure 2:
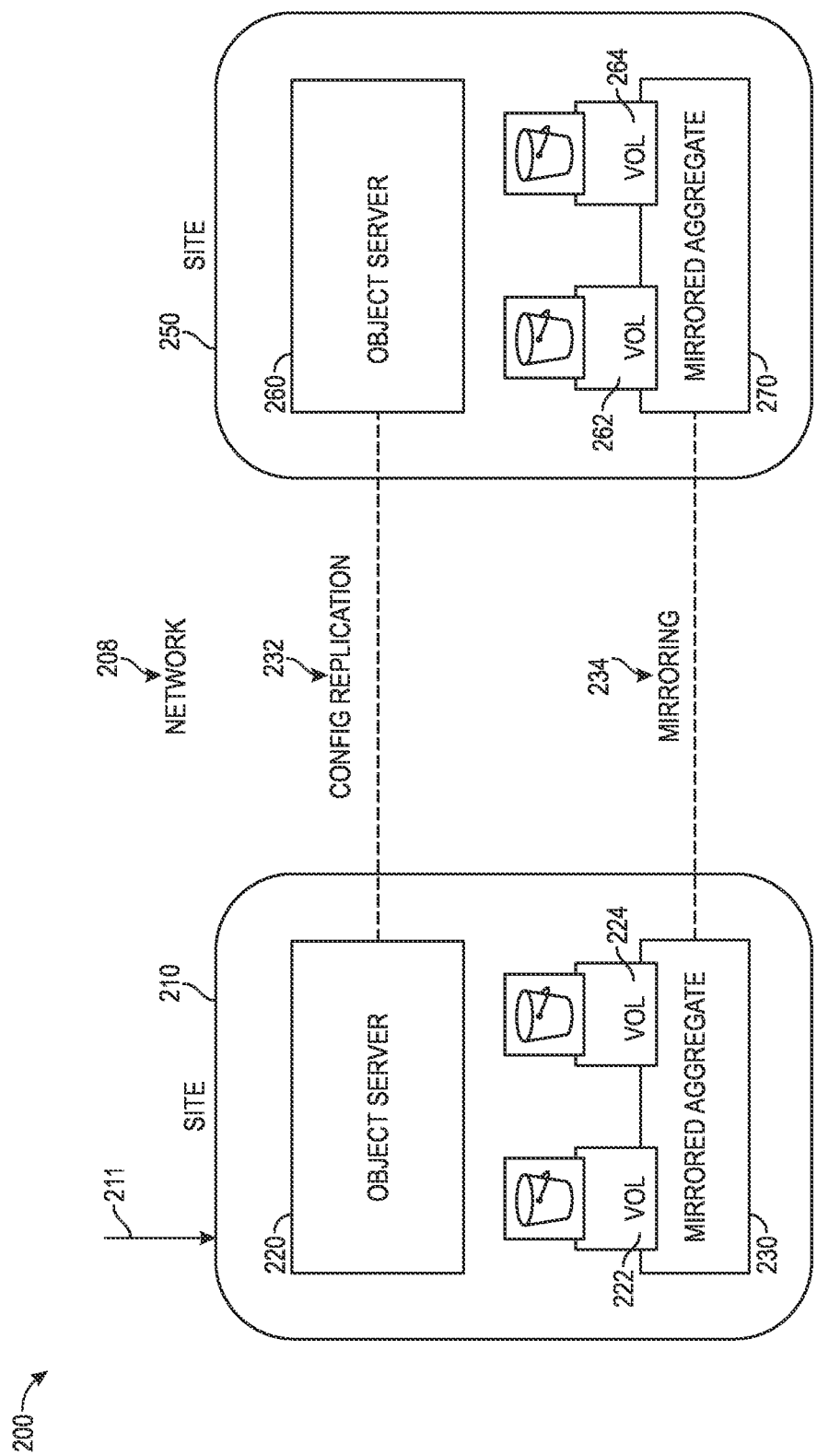
FIG. 2 is a block diagram illustrating a multi-site distributed storage system 200 in which various embodiments may be implemented.

FIG. 2 is a block diagram illustrating a multi-site distributed storage system 200 in which various embodiments may be implemented. In various examples described herein, the multi-site distributed storage system includes storage sites 210 and 250 that are coupled to each other via a network 208, which, depending upon the particular implementation, may be a Local Area Network (LAN), a Wide Area Network (WAN), or the Internet.

Those of ordinary skill in the art will appreciate additional IT infrastructure may be included within the sites 210 and 250. The site 210 includes an object server 220 that includes bucket level configuration information, OSP audit information, OSP user information, and OSP groups. The site 210 also includes volumes 222 and 224 and a mirrored aggregate 230. Each volume can include buckets. A volume 222 can be an object store to store objects while volume 224 can implement NAS protocols to organize files and directories. The site 210 can be configured as a primary site that receives and processes input/output (I/O) operations 211 for client devices using a software application.

The site 250 can be a disaster recovery site that mirror objects and files from the site 210. The site 250 includes an object server 260 that includes bucket level configuration information, OSP audit information, OSP user information, and OSP groups. The site 250 also includes volumes 262 and 264 and a mirrored aggregate 270. Each volume can include buckets. A volume 262 can be an object store to store objects while volume 264 can implement NAS protocols to organize files and directories.

In one example, volume 262 is a mirrored copy of the volume 222 to provide non-disruptive operations at all times even in the presence of failures including, but not limited to, network disconnection between the clusters and buckets. The content of a bucket of the volume 222 can be mirrored (e.g., RAID mirroring) via link 234 with synchronous replication to the volume 262. The content of the volume 224 can be mirrored via link 234 with synchronous replication to the volume 264.

Configuration information is also synchronously replicated between object server 220 and object server 260 with link 232. The distributed storage system 200 has an operating system (OS) to provide data protection at a granularity of individual buckets (sub volume granularity).

Storage objects in storage systems may be subject to metadata corruption, unrecoverable aggregate, or permanent site failure. Metadata is a summary and description about data that is used to classify, organize, label, and understand data. The distributed storage systems of the present design provide data protection for storage objects with a synchronous copy of data depending on a recovery point objective (RPO) protection. In one example, the RPO is zero.

Figure 3:
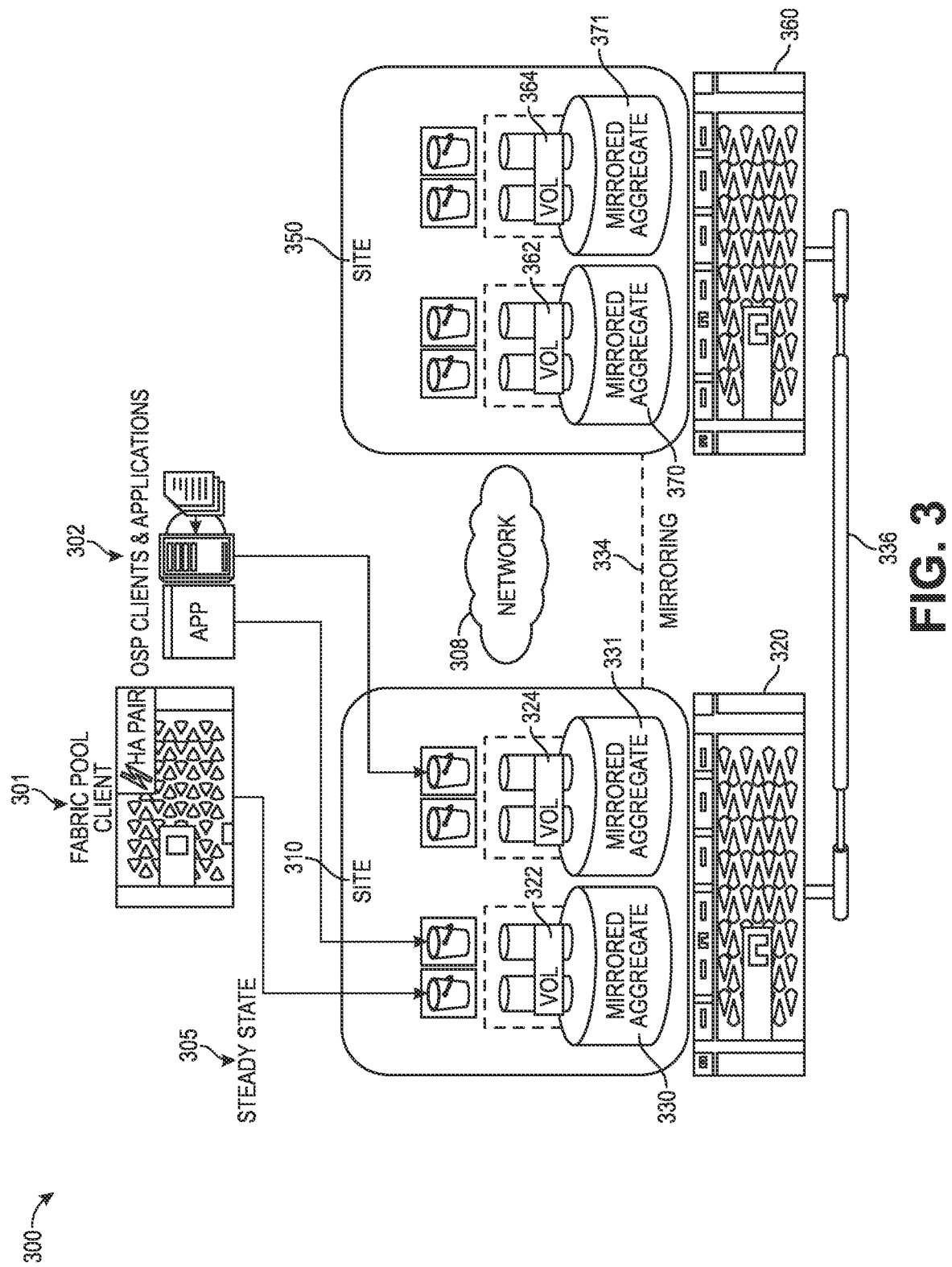
FIG. 3 is a block diagram illustrating a steady state 305 of a multi-site distributed storage system 300 in which various embodiments may be implemented.
Figure 4:
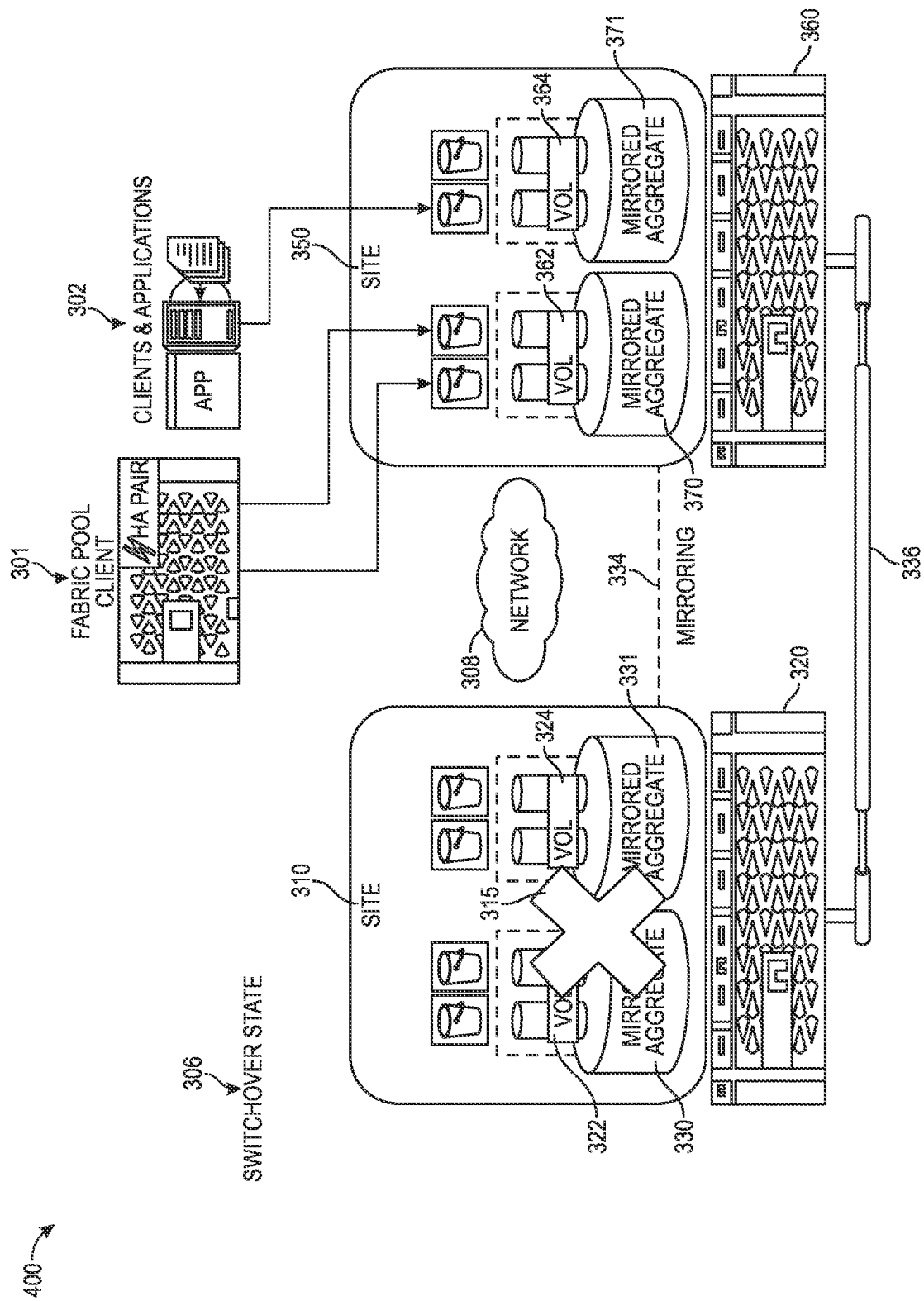
FIG. 4 is a block diagram illustrating a switchover state 306 of the multi-site distributed storage system 300 in which various embodiments may be implemented.
Figure 5:
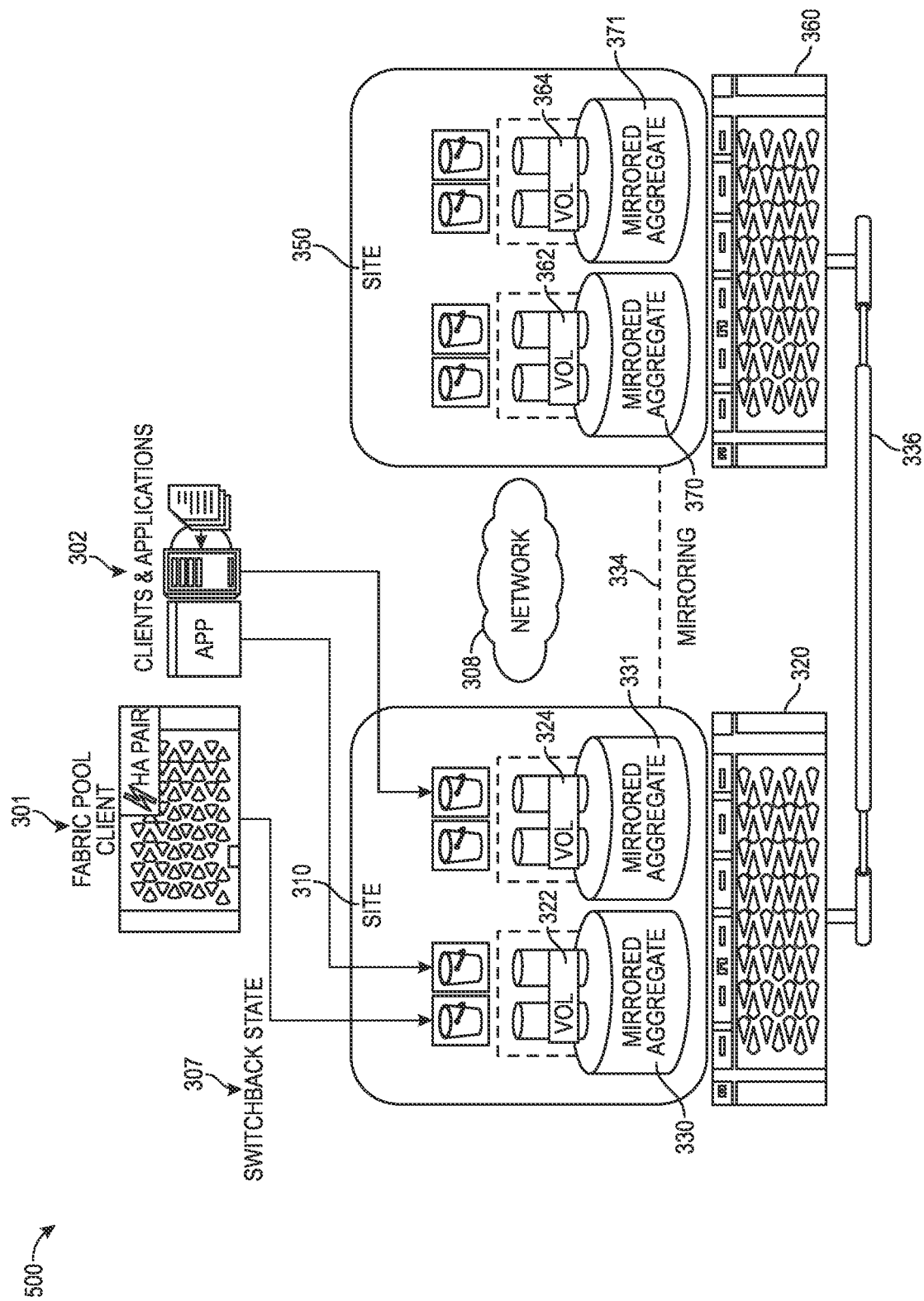
FIG. 5 is a block diagram illustrating a switchback state 307 of the multi-site distributed storage system 300 in which various embodiments may be implemented.

FIGS. 3-5 illustrates different states of the system 300.

FIG. 3 is a block diagram illustrating a steady state 305 of a multi-site distributed storage system 300 in which various embodiments may be implemented. In various examples described herein, the multi-site distributed storage system includes storage sites 310 and 350 that are coupled to each other via a network 308 (e.g., IP network to replicate cluster configuration information between the sites), which, depending upon the particular implementation, may be a Local Area Network (LAN), a Wide Area Network (WAN), or the Internet. The sites are also connected by inter-switch links 336 (e.g., Fiber Channel or IP connection that is used for storage and NVRAM synchronous replication between the two clusters). The multi-site distributed storage system 300 provides redundancy in case of a failure by combining high availability and synchronous replication to mirror aggregates (e.g., 330, 332, 370, 372) to storage (e.g., 320, 360) in each cluster.

Those of ordinary skill in the art will appreciate additional IT infrastructure may be included within the sites 310 and 350. The site 310 may include flex group volumes 322 and 324 and mirrored aggregates 330 and 331. Each volume can include buckets. A volume 322 can be an object store to store objects while volumes 324 can implement NAS protocols to organize files and directories. The aggregates 330 and 331 can include storage disks. The site 310 can be configured as a primary storage site that receives and processes input/output (I/O) operations from fabric pool client 301 and OSP clients and applications 302.

The storage site 350 can be a disaster recovery site that mirrors objects and files from the site 310. The site 350 may include an object server that includes bucket level configuration information, OSP audit information, OSP user information, and OSP groups as discussed for object server 260. The site 350 also includes volumes 362 and 364 and corresponding mirrored aggregates 370 and 371. Each volume can include buckets. Volume 362 can be an object store to store objects while volume 364 can implement NAS protocols to organize files and directories or vice versa.

In one example, volume 362 is a mirrored copy of the volume 322 to provide non-disruptive operations at all times even in the presence of failures including, but not limited to, network disconnection between the clusters and buckets. The content of a bucket of the volume 322 can be mirrored (e.g., RAID mirroring) via link 334 with synchronous replication to the volume 362. The content of the volume 324 can be mirrored via link 334 with synchronous replication to the volume 364.

Configuration information is also synchronously replicated between sites 310 and 350. The distributed storage system 300 has an operating system (OS) to provide data protection at a granularity of individual buckets (sub volume granularity).

FIG. 4 is a block diagram illustrating a switchover state 306 of the multi-site distributed storage system 300 in which various embodiments may be implemented. Initially for the steady state of FIG. 3, the storage site 310 serves I/O operations to client devices (e.g., fabric pool client 301, OSP clients and applications 302). Upon occurrence of a failure 315 at the storage site 310 (or unavailability of one or more storage nodes of the storage site 310), a switchover state is initiated to cause the storage site 350 to handle serving of I/O operations for client devices due to a temporary failure or temporary unavailability of the storage site 310. Due to the synchronous replication of data and configuration information from the storage site 310 to the storage site 350, the volumes of storage site 350 have the same data and configuration information as the volumes of storage site 310. Thus, the system 300 provides business continuity and non-disruptive operations with zero recovery time objective (RTO), and ensures consistency between the objects and files in the volumes of the sites 310 and 350.

FIG. 5 is a block diagram illustrating a switchback state 307 of the multi-site distributed storage system 300 in which various embodiments may be implemented. In one example, upon operations of the storage site 310 being restored, a switchback state 307 is initiated to cause the storage site 350 to handle serving of I/O operations for client devices. Due to the synchronous replication of data and configuration information from the storage site 310 to the storage site 350, the volumes of storage site 350 have the same data and configuration information as the volumes of storage site 310.

Figure 6:
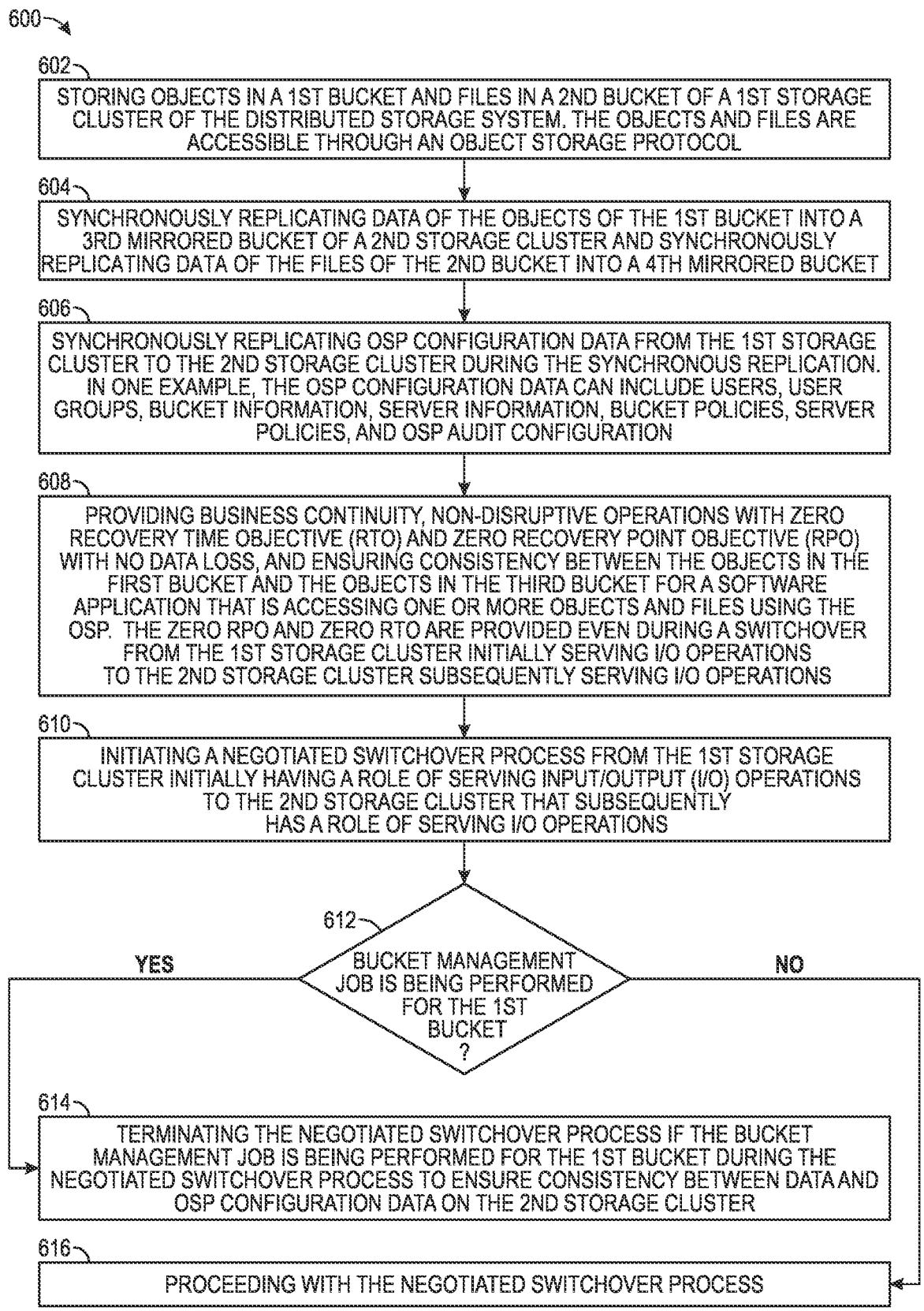
FIG. 6 illustrates a computer implemented method performed by one or more processing resources of a distributed storage system to manage and synchronously replicate data and configuration information for storage objects and files of a distributed storage system in accordance with one embodiment.

FIG. 6 illustrates a computer implemented method performed by one or more processing resources of a distributed storage system to manage and synchronously replicate data and configuration information for storage objects and files of a distributed storage system in accordance with one embodiment. In the context of the present example, The operations of computer-implemented method 600 may be executed by a storage controller, a storage virtual machine, a multi-site distributed storage system having an OS, a storage node, a computer system, a machine, a server, a web appliance, a centralized system, a distributed node, or any system, which includes processing logic (e.g., one or more processors, a processing resource). The processing logic may include hardware (circuitry, dedicated logic, etc.), software (such as is run on a general purpose computer system or a dedicated machine or a device), or a combination of both.

At operation 602, the computer-implemented method includes storing objects in a first bucket and files in a second bucket of a first storage cluster of the distributed storage system. The objects and files are accessible through an object storage protocol. The storage system supports OSP and NAS. The second bucket can support access to files in a file directory with OSP, and the volume hosting the second bucket supports access to the same files through NAS protocols.

At operation 604, the computer-implemented method includes synchronously replicating data of the objects of the first bucket into a third mirrored bucket of a second storage cluster of the distributed storage system and synchronously replicating data of the files from the second bucket into a fourth mirrored bucket of the second storage cluster.

At operation 606, the computer-implemented method includes synchronously replicating OSP configuration data from the first storage cluster to the second storage cluster. In one example, the OSP configuration data can include users, user groups, bucket information, server information, bucket policies, server policies, and OSP audit configuration. In order to replicate object storage configuration data efficiently to the second storage cluster of a disaster recovery site (e.g., disaster recovery site), every operation that creates, modifies, or removes persistent configuration on the first storage cluster of an active site is added to a reliable replication stream and replayed on the disaster recovery site. This operation replay ensures that the same configuration of the first storage cluster is also stored persistently on the second storage cluster of the disaster recovery site.

At operation 608, the computer-implemented method includes providing business continuity, non-disruptive operations with zero recovery time objective (RTO) and zero recovery point objective (RPO) with no data loss, and ensuring consistency between the objects in the first bucket and the objects in the third bucket for a software application that is accessing one or more objects and files using the OSP. The zero RPO and zero RTO are provided even during a switchover from the first storage cluster initially serving I/O operations to a second storage cluster subsequently serving I/O operations.

In one example, the first storage cluster is connected to the second storage cluster with internet protocol links. In another example, the first storage cluster is connected to the second storage cluster with fiber channels.

If a switchover happens when a bucket management job is running at the first storage cluster, inconsistency between data and configuration data may arise on the second storage cluster. For example, during a bucket create operation to create a new bucket on an OSP enabled storage VM, switchover happens after a bucket chapter is created in a data plane of the first storage cluster and before bucket configurations are replicated by a replication service from the first storage cluster to the second storage cluster. In this case, the second storage cluster may end up with dangling bucket chapters. To reduce the chances of inconsistencies, the present design vetoes or prevents switchover and switchback processes while OSP bucket management jobs are executing. The present design also prevents OSP bucket management jobs from starting if a switchover process or switchback is running.

At operation 610, the computer-implemented method initiates a negotiated switchover process from the first storage cluster initially having a role of serving input/output (I/O) operations to the second storage cluster that subsequently has a role of serving I/O operations.

At operation 612, the computer-implemented method determines if a bucket management job is being performed for the first bucket. At operation 614, the computer-implemented method terminates the negotiated switchover process if the bucket management job is being performed for the first bucket during the negotiated switchover process to ensure consistency between data and OSP configuration data on the secondary storage cluster.

If no bucket management job is being performed, then the computer-implemented method proceeds with the negotiated switchover process at operation 616.

Figure 7:
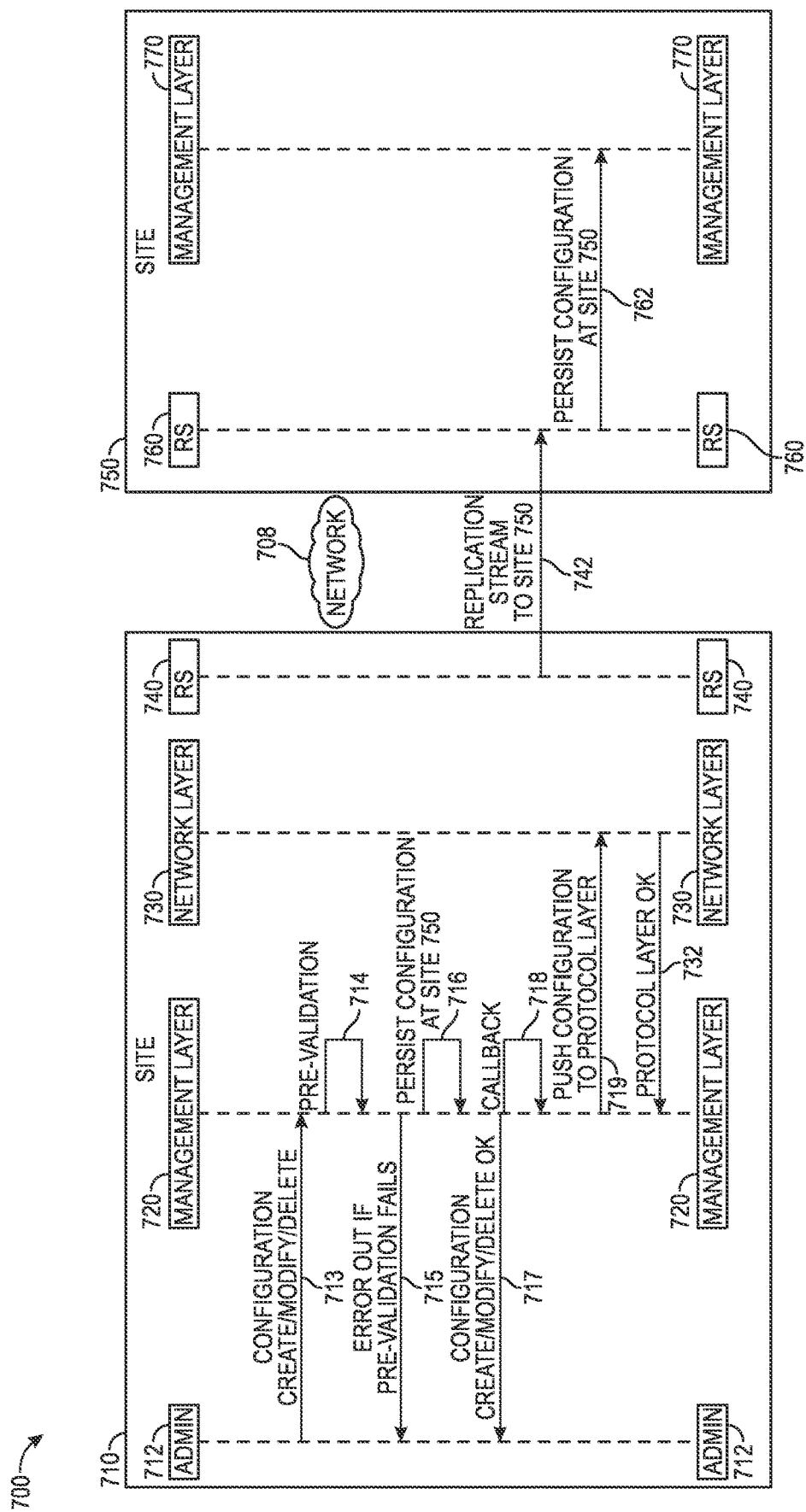
FIG. 7 illustrates different layers (e.g., administrative layer 712, management layers 720 and 770, network layer 730, and replication services 740 and 760) performing operations for replicating configuration information from storage site 710 to storage site 750.

FIG. 7 is a block diagram illustrating a multi-site distributed storage system 700 that utilizes an object storage protocol (OSP) and network attached storage protocol (NAS) in which various embodiments may be implemented. The storage system 700 can include similar components as discussed above for systems 300, 400, and 500 of FIGS. 3-5. FIG. 7 illustrates different layers (e.g., administrative layer 712, management layers 720 and 770, network layer 730, and replication services 740 and 760) performing operations for replicating configuration information from source storage site 710 to destination storage site 750.

In various examples described herein, the multi-site distributed storage system 700 includes storage sites 710 and 750 that are coupled to each other via a network 708 (e.g., IP network to replicate cluster configuration information between the sites), which, depending upon the particular implementation, may be a Local Area Network (LAN), a Wide Area Network (WAN), or the Internet. The sites may also be connected by inter-switch links (e.g., Fiber Channel or IP connection that is used for storage and NVRAM synchronous replication between the two clusters). The multi-site distributed storage system 700 provides redundancy in case of a failure by combining high availability and synchronous replication to mirror aggregates (e.g., 330, 332, 370, 372) to storage (e.g., 320, 360) in each cluster.

Those of ordinary skill in the art will appreciate additional IT infrastructure may be included within the sites 710 and 750. The site 710 may include flex group volumes and mirrored aggregates. A first volume can be an object store to store objects while a second volume can implement NAS protocols to organize files and directories. The aggregates can include storage disks. The site 710 can be configured as a primary storage site that receives and processes input/output (I/O) operations from client devices.

The storage site 750 can be a disaster recovery site that mirrors objects and files from the site 710. The site 750 may include bucket level configuration information, OSP audit information, OSP user information, and OSP groups.

In one example, at the storage site 710, the admin layer 712 sends a configuration message 713 to management layer 720 to create, modify, or delete configuration information. The management layer 720 performs a pre-validation operation 714 and then sends an error message 715 if pre-validation fails. Next, the management layer 720 stores (e.g., persists) the create, modify, or delete configuration information at the storage site 710 and sends a message 717 to the admin layer 716 to indicate that a configuration create, modify, or delete operation has succeeded. The management layer 720 performs a callback operation 718 and sends a message 719 to the network layer 730 to push the create, modify, delete configuration information to a network layer 730. The network layer 730 sends a message 732 to acknowledge receiving the create, modify, delete configuration information.

A replication service 740 (e.g., replication engine) then sends a replication stream 742 to mirror the configuration information (e.g., newly created, modified, or deleted configuration information) to a replication service 760 of storage site 750. The replication service 760 sends a message 762 to a management layer 770 to store (e.g., persist) the mirrored configuration information at storage site 750.

The distributed storage system supports auditing of data and management events. Such events are efficiently consolidated into a single audit log by an auditing job. The raw audit data as well as the already-consolidated logs are stored on mirrored aggregate storage and therefore are synchronously replicated to the disaster recovery site. In the event of a switchover to the disaster recovery site, the auditing job is made inactive on the previously-active primary storage site and created or activated on the disaster recovery (secondary storage) site. The auditing job seamlessly continues processing the audit data on the disaster recovery site.

Figure 8A:
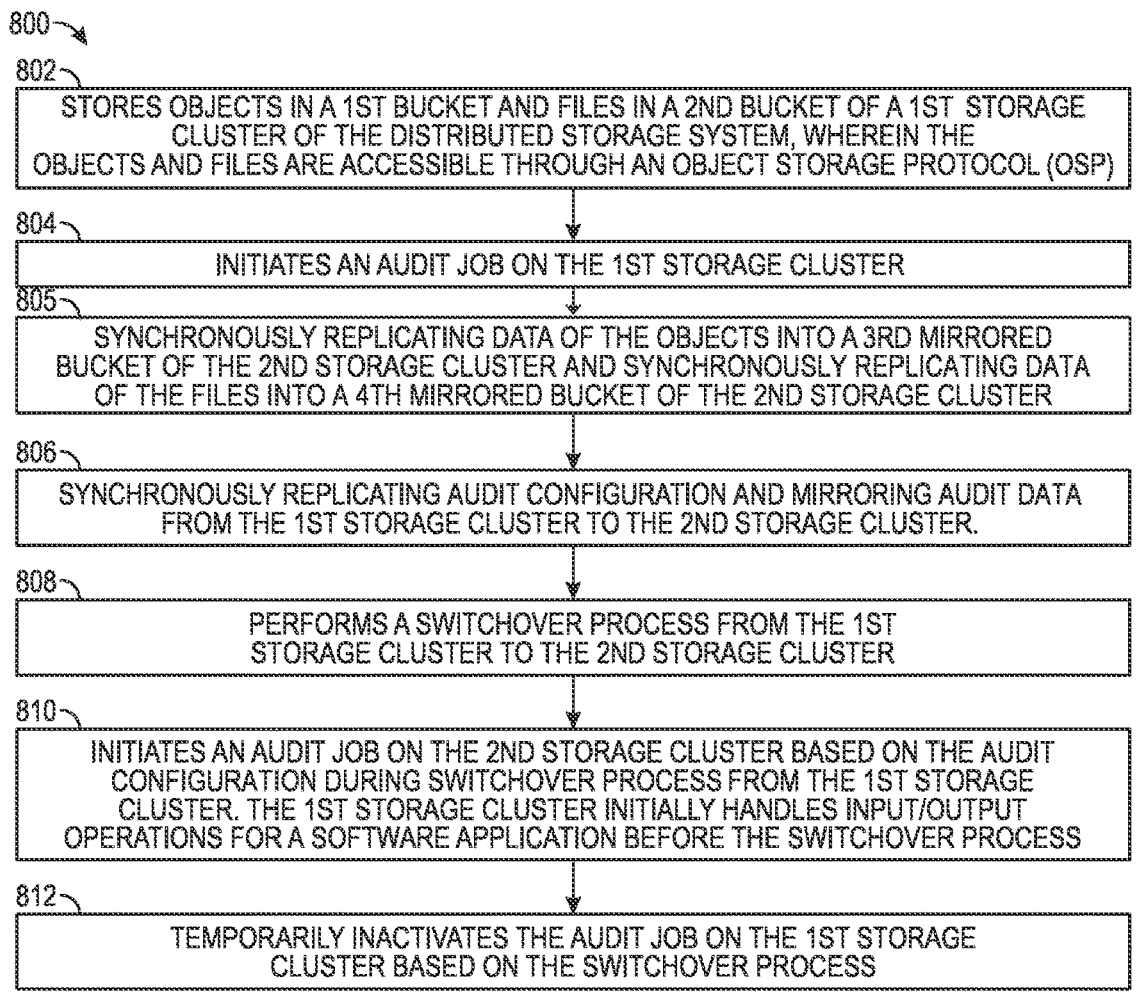
FIGS. 8A and 8B illustrate a computer implemented method performed by one or more processing resources of a distributed storage system to manage auditing of data and configuration information for storage objects and files of a distributed storage system in accordance with one embodiment.
Figure 8B:
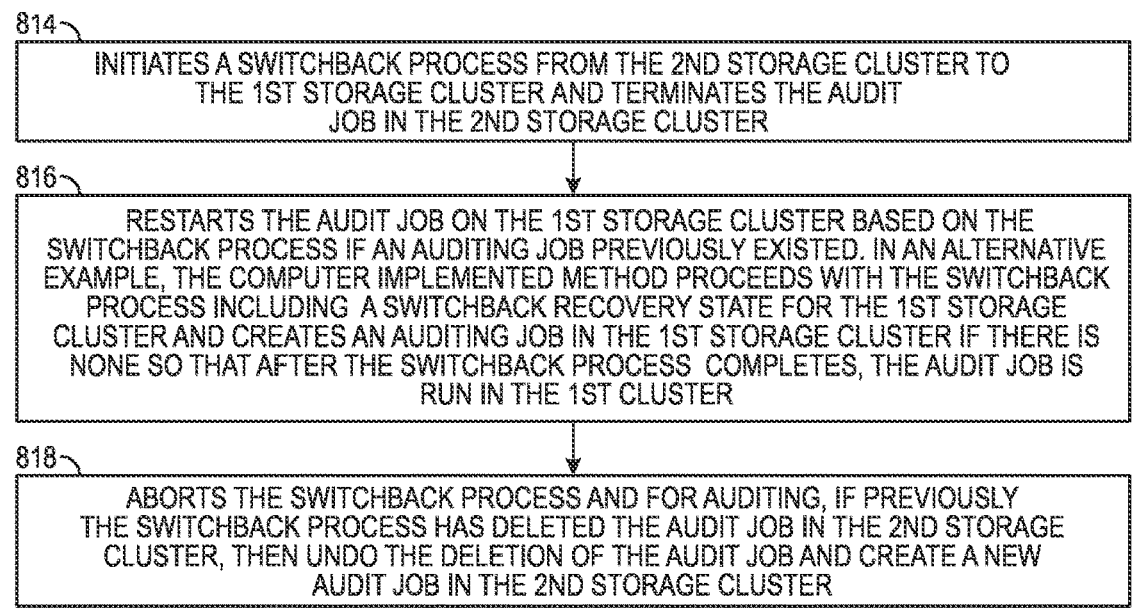

FIGS. 8A and 8B illustrate a computer implemented method performed by one or more processing resources of a distributed storage system to manage auditing of data and configuration information for storage objects and files of a distributed storage system in accordance with one embodiment. In the context of the present example, The operations of computer-implemented method 800 may be executed by a storage controller, a storage virtual machine, a multi-site distributed storage system having an OS, a storage node, a computer system, a machine, a server, a web appliance, a centralized system, a distributed node, or any system, which includes processing logic (e.g., one or more processors, a processing resource). The processing logic may include hardware (circuitry, dedicated logic, etc.), software (such as is run on a general purpose computer system or a dedicated machine or a device), or a combination of both.

At operation 802, the computer implemented method stores objects in a first bucket and files in a second bucket of a first storage cluster of the distributed storage system. In one example, the objects and files are accessible through an object storage protocol (OSP). At operation 804, the computer implemented method initiates an audit job on the first storage cluster. The OS of the storage cluster supports auditing of data and management events. Such events are efficiently consolidated into a single audit log by an auditing job. The raw audit data as well as the already-consolidated logs are stored on mirrored aggregate storage and therefore are synchronously replicated to a second storage cluster of the distributed storage system.

At operation 805, the computer implemented method synchronously replicates data of the objects into a second mirrored bucket of the second storage cluster of the distributed storage system and synchronously replicates data of the files from the second bucket into a fourth mirrored bucket of the second storage cluster. At operation 806, the computer implemented method synchronously replicates audit configuration (e.g., management configuration to control type of audit event, management events, etc.) of the OSP audit job and mirroring audit data (e.g., RAID mirroring) from the first storage cluster to the second storage cluster.

Auditing object store audit configuration, which allows auditing to be enabled on individual buckets on an object store server will be replicated from the first storage cluster to the second storage cluster. To ensure auditing works in scenarios such as switchover/switchback, switchback-recovery, and switchback-abort, the present design includes support for stopping, starting, and rehosting an audit job appropriately during these scenarios. The audit logs which have been consolidated (e.g., the audit files) should be available in the destination cluster. Since the audit data is on the same aggregates as the file and object data, the audit data is mirrored from the first storage cluster, and the audit consolidation job will execute by reading from the mirrored audit data of the second storage cluster.

At operation 808, the computer implemented method performs a switchover process from the first storage cluster to the second storage cluster. At operation 810, the computer implemented method initiates an audit job on the second storage cluster based on the audit configuration during the switchover process from the first storage cluster. The first storage cluster initially handles input/output operations for a software application before the switchover process. At operation 812, the computer implemented method temporarily inactivates the audit job on the first storage cluster based on the switchover process.

At operation 814 of FIG. 8B, the computer implemented method initiates a switchback process from the second storage cluster to the first storage cluster and terminates the audit job in the second storage cluster. At operation 816, in one example, the computer implemented method restarts the audit job on the first storage cluster based on the switchback process if an auditing job previously existed. In an alternative example, the computer implemented method proceeds with the switchback process including a switchback recovery state for the first storage cluster and creates an auditing job in the first storage cluster if there is none so that after the switchback process completes, the audit job is run in the first storage cluster.

At operation 818, the computer implemented method aborts the switchback process and for auditing, if previously the switchback process has deleted the audit job in the second storage cluster, then undo the deletion of the audit job and create a new audit job in the second storage cluster.

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 9:
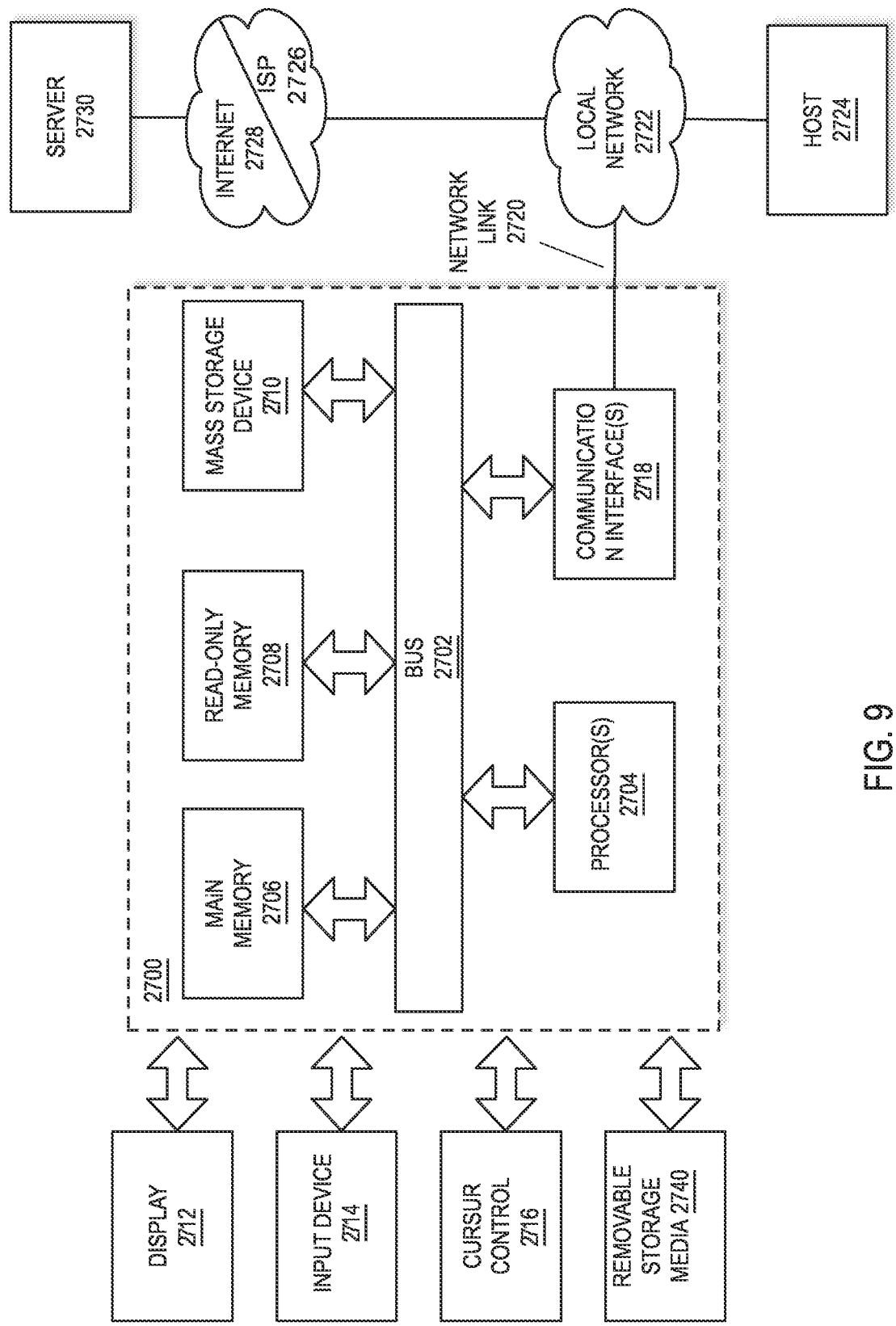
FIG. 9 is a block diagram that illustrates a computer system 2700 in which or with which an embodiment of the present disclosure may be implemented.

FIG. 9 is a block diagram that illustrates a computer system 2700 in which or with which an embodiment of the present disclosure may be implemented. Computer system 2700 may be representative of all or a portion of the computing resources associated with a node (e.g., storage nodes 136a-n or storage nodes 146a-n) of a distributed storage system or an administrative workstation (e.g., computer system 110). Notably, components of computer system 2700 described herein are meant only to exemplify various possibilities. In no way should example computer system 2700 limit the scope of the present disclosure. In the context of the present example, computer system 2700 includes a bus 2702 or other communication mechanism for communicating information, and a processing resource (e.g., a hardware processor 2704) coupled with bus 2702 for processing information. Hardware processor 2704 may be, for example, a general purpose microprocessor.

Computer system 2700 also includes a main memory 2706, such as a random access memory (RAM) or other dynamic storage device, coupled to bus 2702 for storing information and instructions to be executed by processor 2704. Main memory 2706 also may be used for storing temporary variables or other intermediate information during execution of instructions to be executed by processor 2704. Such instructions, when stored in non-transitory storage media accessible to processor 2704, render computer system 2700 into a special-purpose machine that is customized to perform the operations specified in the instructions.

Computer system 2700 further includes a read only memory (ROM) 2708 or other static storage device coupled to bus 2702 for storing static information and instructions for processor 2704. A storage device 2710, e.g., a magnetic disk, optical disk or flash disk (made of flash memory chips), is provided and coupled to bus 2702 for storing information and instructions.

Computer system 2700 may be coupled via bus 2702 to a display 2712, e.g., a cathode ray tube (CRT), Liquid Crystal Display (LCD), Organic Light-Emitting Diode Display (OLED), Digital Light Processing Display (DLP) or the like, for displaying information to a computer user. An input device 2714, including alphanumeric and other keys, is coupled to bus 2702 for communicating information and command selections to processor 2704. Another type of user input device is cursor control 2716, such as a mouse, a trackball, a trackpad, or cursor direction keys for communicating direction information and command selections to processor 2704 and for controlling cursor movement on display 2712. This input device typically has two degrees of freedom in two axes, a first axis (e.g., x) and a second axis (e.g., y), that allows the device to specify positions in a plane.

Removable storage media 2740 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 2700 may implement the techniques described herein using customized hard-wired logic, one or more ASICs or FPGAs, firmware or program logic which in combination with the computer system causes or programs computer system 2700 to be a special-purpose machine. According to one embodiment, the techniques herein are performed by computer system 2700 in response to processor 2704 executing one or more sequences of one or more instructions contained in main memory 2706. Such instructions may be read into main memory 2706 from another storage medium, such as storage device 2710. Execution of the sequences of instructions contained in main memory 2706 causes processor 2704 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 2710. Volatile media includes dynamic memory, such as main memory 2706. Common forms of storage media include, for example, a flexible disk, a hard disk, a solid state drive, a magnetic tape, or any other magnetic data storage medium, a non-transitory computer-readable medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2702. Transmission media can also take the form of acoustic or light waves, such as those generated during radio-wave and infra-red data communications.

Various forms of media may be involved in carrying one or more sequences of one or more instructions to processor 2704 for execution. For example, the instructions may initially be carried on a magnetic disk or solid state drive of a remote computer. The remote computer can load the instructions into its dynamic memory and send the instructions over a telephone line using a modem. A modem local to computer system 2700 can receive the data on the telephone line and use an infra-red transmitter to convert the data to an infra-red signal. An infra-red detector can receive the data carried in the infra-red signal and appropriate circuitry can place the data on bus 2702. Bus 2702 carries the data to main memory 2706, from which processor 2704 retrieves and executes the instructions. The instructions received by main memory 2706 may optionally be stored on storage device 2710 either before or after execution by processor 2704.

Computer system 2700 also includes a communication interface 2718 coupled to bus 2702. Communication interface 2718 provides a two-way data communication coupling to a network link 2720 that is connected to a local network 2722. For example, communication interface 2718 may be an integrated services digital network (ISDN) card, cable modem, satellite modem, or a modem to provide a data communication connection to a corresponding type of telephone line. As another example, communication interface 2718 may be a local area network (LAN) card to provide a data communication connection to a compatible LAN. Wireless links may also be implemented. In any such implementation, communication interface 2718 sends and receives electrical, electromagnetic or optical signals that carry digital data streams representing various types of information.

Network link 2720 typically provides data communication through one or more networks to other data devices. For example, network link 2720 may provide a connection through local network 2722 to a host computer 2724 or to data equipment operated by an Internet Service Provider (ISP) 2726. ISP 2726 in turn provides data communication services through the world wide packet data communication network now commonly referred to as the "Internet" 2728. Local network 2722 and Internet 2728 both use electrical, electromagnetic or optical signals that carry digital data streams. The signals through the various networks and the signals on network link 2720 and through communication interface 2718, which carry the digital data to and from computer system 2700, are example forms of transmission media.

Computer system 2700 can send messages and receive data, including program code, through the network(s), network link 2720 and communication interface 2718. In the Internet example, a server 2730 might transmit a requested code for an application program through Internet 2728, ISP 2726, local network 2722 and communication interface 2718. The received code may be executed by processor 2704 as it is received, or stored in storage device 2710, or other non-volatile storage for later execution.

Figure 10:
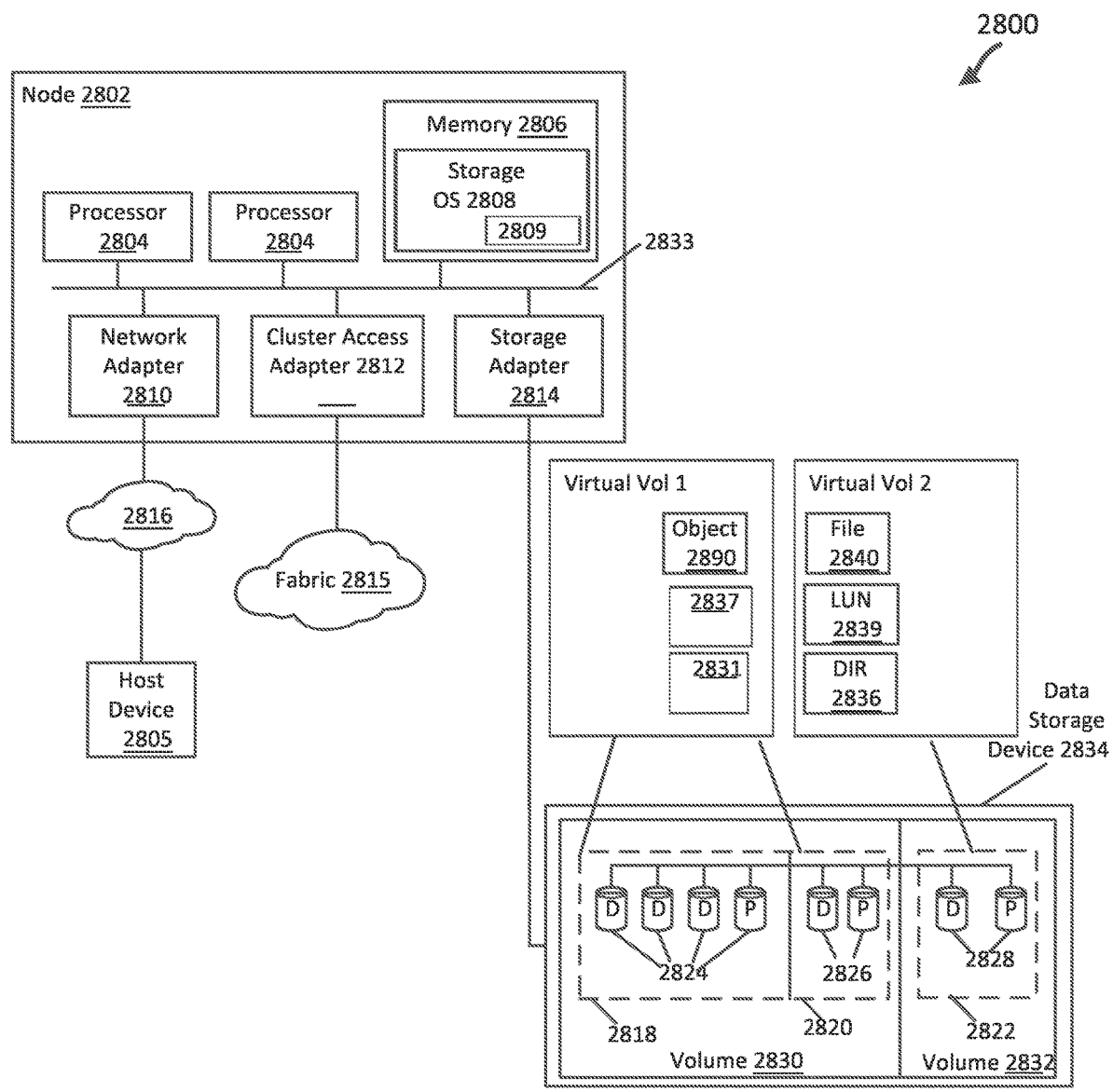
FIG. 10 is an illustrative example of a distributed storage system 2800, in accordance with one or more aspects of the present disclosure.

FIG. 10 is an illustrative example of a distributed storage system 2800, in accordance with one or more aspects of the present disclosure. The distributed storage system 2800 includes a node 2802 (e.g., nodes 136*a*-136*n*, 146*a*-146*n*, etc.), and a data storage device 2834. The node 2802 may be a general purpose computer, for example, or some other computing device particularly configured to operate as a storage server. A host device 2805 may be connected to the node 2802 over a network 2816, for example, to provide access to files and/or other data stored on the data storage device 2834. The node 2802 may include a storage controller that provides client devices, such as the host device 2805, with access to data stored within data storage device 2834.

The data storage device 2834 can include mass storage devices, such as disks 2824, 2826, 2828 of a disk array 2818, 2820, 2822. It will be appreciated that the techniques and systems, described herein, are not limited by the example illustrated in FIG. 10. For example, disks 2824, 2826, 2828 may include any type of mass storage devices, including but not limited to magnetic disk drives, flash memory (e.g., SSDs), and any other similar media adapted to store information, including, for example, data (D) and/or parity (P) information.

The node 2802 includes one or more processors 2804, a memory 2806, a network adapter 2810, a cluster access adapter 2812, and a storage adapter 2814 interconnected by a system bus 2833. The data storage system 2800 also includes an operating system 2808 installed in the Memory 2806 of the node 2802 that can, for example, implement a Redundant Array of Independent (or Inexpensive) Disks (RAID) optimization technique, or error correction coding (to name just a few examples), to optimize a reconstruction process of data of a failed disk in an array. The operating system 2808 may manage communications for the data storage system 2800, and communications between other data storage systems that may be in a clustered network, such as attached to a cluster fabric 2815. Thus, the node 2802, such as a network storage controller, can respond to host device requests to manage data on the data storage device 2834 (e.g., or additional clustered devices) in accordance with these host device requests.

The operating system 2808 may include several modules or "layers" executed by one or both of the network adapter 2810 or the storage adapter 2814. These layers may include a file system 2840 that keeps track of objects and object namespaces stored in the storage devices and manages read/write operations (e.g., executes read/write operations on storage in response to client requests). The operating system 2808 may establish one or more file systems on the data storage system 2800, where a file system can include software code and data structures that implement a persistent namespace of files and directories, for example. The file system may logically organize stored information as a non-hierarchical structure for files/directories/objects at the storage devices. Each "on disk" file may be implemented as a set of blocks configured to store information, such as text. These data blocks may be organized within a volume block number (VBN) space that is maintained by one or more databases accessible by the storage operating system 2808. The file system may also assign each data block in the file a corresponding "file offset" or a file block number (FBN). The file system may assign sequences of FBNs on a per-file basis, whereas VBNs may be assigned over a larger volume address space. The file system may organize the data blocks within the VBN space as a logical volume. The file system may be composed of a contiguous range of VBNs from zero to n, for a file system of size n–1 blocks, where n is a number greater than 1. In an example, when a new data storage device (not shown) is added to a clustered network system, the operating system 2808 is informed where, in an existing directory tree, new files associated with the new data storage device are to be stored. This is often referred to as "mounting" a file system.

In the example data storage system 2800, memory 2806 may include storage locations that are addressable by the processors 2804 and network adapter 2810, cluster access adapter 2812, and/or storage adapter 2814 for storing related software application code and data structures. The processors 2804, the network adapter 2810, the cluster access adapter 2812, and/or the storage adapter 2814 may, for example, include processing elements and/or logic circuitry configured to execute the software code and manipulate the data structures. The operating system 2808, portions of which are typically resident in the memory 2806 and executed by the processing elements, functionally organizes the storage system by, among other things, invoking storage operations in support of a file service implemented by the storage system. It will be apparent that other processing and memory mechanisms, including various computer readable media, may be used for storing and/or executing application instructions pertaining to the techniques described herein. For example, the operating system may also utilize one or more control files (not shown) to aid in the provisioning of virtual machines.

The network adapter 2810 includes the mechanical, electrical and signaling circuitry for connecting the data storage system 2800 to the host device 2805 over the network 2816, which may include, among other things, a point-to-point connection or a shared medium, such as a LAN. The host device 2805 may be a general-purpose computer configured to execute applications. As described above, the host device 2805 may interact with the data storage system 2800 in accordance with a client/host model of information delivery.

The storage adapter 2814 cooperates with the operating system 2808 executing on the node 2802 to access information requested by the host device 2805 (e.g., access data on a storage device managed by a network storage controller). The information may be stored on any type of attached array of writeable media such as magnetic disk drives, flash memory, and/or any other similar media adapted to store information. In the example data storage system 2800, the information may be stored in data blocks on the disks 2824, 2826, 2828. The storage adapter 2814 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information may be retrieved by the storage adapter 2814 and, in some examples, processed by the one or more processors 2804 (or the storage adapter 2814 itself) prior to being forwarded over the system bus 2842 to the network adapter 2810 (and/or the cluster access adapter 2812 if sending to another node in the cluster) where the information is formatted into a data packet and returned to the host device 2805 over the network 2816 (and/or returned to another node attached to the cluster over the cluster fabric 2815).

In an embodiment, storage of information on disk arrays 2818, 2820, 2822 can be implemented as one or more storage volumes 2830, 2832 that include a cluster of disks 2824, 2826, 2828 defining an overall logical arrangement of disk space. The disks 2824, 2826, 2828 that include one or more volumes may be organized as one or more groups of RAIDs (while in other examples, error correction coding may be used). As an example, volume 2830 includes an aggregate of disk arrays 2818 and 2820, which include the cluster of disks 2824 and 2826. In an example, to facilitate access to disks 2824, 2826, 2828, the operating system 2808 may implement a file system (e.g., write anywhere file system) that logically organizes the information as a non-hierarchical structure of files on the disks. Accordingly, respective files may be implemented as a set of disk blocks configured to store information, whereas databases may be implemented to store information about the files and where they are stored.

Whatever the underlying physical configuration within this data storage system 2800, data can be stored as files within physical and/or virtual volumes, which can be associated with respective volume identifiers, such as file system identifiers (FSIDs), which can be 32-bits in length in one example. A physical volume corresponds to at least a portion of physical storage devices whose address, addressable space, location, etc. does not change, such as at least some of one or more data storage devices 2834 (e.g., a Redundant Array of Independent (or Inexpensive) Disks (RAID system)). In some examples, the location of the physical volume does not change in that the (range of) address(es) used to access it may generally remain constant. A virtual volume, in contrast, may be stored over an aggregate of disparate portions of different physical storage devices. The virtual volume may be a collection of different available portions of different physical storage device locations, such as some available space from one or more of the disks 2824, 2826, and/or 2828, and is not "tied" to any one particular storage device. Accordingly, a virtual volume may be said to include a layer of abstraction or virtualization, which allows it to be resized and/or flexible in some regards.

Further, a virtual volume 1 stores objects 2890 while a virtual volume 2 stores files 2840. The virtual volume 2 may optionally include one or more logical unit numbers (LUNs) 2839 and/or directories 2836. In one example, virtual volume 2 includes files 2840, LUN 2839, and directories 2836. In another example, the virtual volume 2 includes files 2840 and directories 2836. LUNs may be characterized as constituting a virtual disk or drive upon which data within the virtual volume may be stored within the aggregate. LUNs maybe referred to as virtual drives, such that they emulate a hard drive from a general purpose computer, while they actually include data blocks stored in various parts of a volume.

One or more data storage devices 2834 may have one or more physical ports, where each physical port may be assigned a target address (e.g., SCSI target address). To represent respective volumes stored on a data storage device, a target address on the data storage device 2834 may be used to identify one or more LUNs 2839. For example, when the node 2802 connects to a volume 2832 through the storage adapter 2814, a connection between the node 2802 and the one or more LUNs 2839 underlying the volume is created. Additionally or alternatively, respective target addresses may identify multiple LUNs, such that a target address may represent multiple volumes.

An object storage system may include the data storage system 2800, which may be part of the clustered network environment 100. A volume may have a plurality of inodes, where each inode may be associated with a plurality of storage blocks. If an object is created and stored in the object storage system, the node 2802 may store the object across one or more blocks. An inode may reference or point to the actual object data by referencing or pointing to the one or more blocks storing the object. An inode may be uniquely identified in the clustered network environment 100 by its file handle, which may be composed of a volume identifier that identifies a volume and an inode number within the volume. The file handle may include a generation number field that indicates how many times this particular inode has been consumed. An inode may be consumed and then freed, and then consumed again for a new purpose. Each time an inode is reused, the generation number may be increased.

Accordingly, if a host device attempts to access an object using a stale generation number, then the access request may fail.

The object storage system may include a database of a first type and one or more databases of a second type. The database of the first type may be a TOC database, and a database of the second type may be a chapter database. As shown in FIG. 10, the virtual volume 1 may store the TOC database 2837, the chapter database 2831, and/or one or more objects 2890. The TOC database may provide an overview of the number of chapter databases in a collection of chapter databases and the location of these chapter databases. For example, the TOC database may store one or more entries or records, each record including a name marker and a chapter database file handle. The name marker may indicate a range of object names covered by a given chapter database, and the chapter database file handle may reference a location at which the chapter database is stored. Additionally, the chapter databases may store one or more entries or records, each record including an object name and an object file handle. The object name may identify an object, and the object file handle may reference a location at which the object is stored.

A chapter database may cover a discrete and continuous range of object names. A chapter database that covers a range of object names may also be referred to as a chapter database that owns, is responsible for, or includes the range of object names. In an example, if an object name is within the flat object storage namespace, exactly one chapter owns the object name. In other words, there may be a one-to-one relationship between an object name and a chapter database. If the chapter database includes an object name, then the chapter database may store a reference to a location at which the object identified by the object name is stored. In some examples, the flat object storage namespace includes an object name and the data corresponding to the object name is not accessible via the disk module. For example, the data may be archived off-site or is using a shared single-instance-storage with other content elsewhere.

A chapter database that covers an object name may not necessarily include the object name. For example, the chapter database may cover the range of object names "A-G," but not include an object name that falls within this range and is requested by a host device. In this example, the object having the object name has not yet been created and saved in the object storage system or is identified by a different object name. The collection of chapter databases serves the overall workload for maintaining (e.g., creating, reading from, writing to, destroying, and the like) objects and their object names. For example, the collection of chapter databases may include an ordered enumeration of all object names within the flat object storage namespace. If the collection of chapter databases were to be concatenated and laid out semantically from beginning to end, the collection of chapter databases would represent the entire object namespace.

What is claimed is:

1. A computer implemented method performed by one or more processing resources of a distributed storage system, the method comprising:
   storing objects each having a unique name in a namespace of a first bucket and files in a file directory of a second bucket of a first storage cluster of the distributed storage system, wherein the objects and files are accessible through an object storage protocol (OSP);
   initiating an OSP audit job on the first storage cluster to manage configuration;
   synchronously replicating OSP audit configuration with a first link from the first storage cluster to the second storage cluster and mirroring audit data with a second link from the first storage cluster to the second storage cluster;
   performing a switchover process from the first storage cluster to the second storage cluster; and
   initiating an audit job on the second storage cluster based on the OSP audit configuration during the switchover process from the first storage cluster, wherein the first storage cluster initially handles input/output operations for a software application before the switchover process.

2. The computer implemented method of claim 1, further comprising:
   temporarily inactivating the OSP audit job on the first storage cluster based on the switchover process.

3. The computer implemented method of claim 1, further comprising:
   initiating a switchback process from the second storage cluster to the first storage cluster; and
   terminating the audit job in the second storage cluster based on the switchback process.

4. The computer implemented method of claim 3, further comprising:
   restarting the OSP audit job on the first storage cluster based on the switchback process.

5. The computer implemented method of claim 3, further comprising:
   proceeding with the switchback process including a switchback recovery state for the first storage cluster; and
   creating an auditing job in the first storage cluster if there is none so that after the switchback process completes, the audit job is run in the first storage cluster.

6. The computer implemented method of claim 3, further comprising:
   aborting the switchback process; and
   for auditing, if previously the switchback process has deleted the audit job in the second storage cluster, then undo the deletion of the audit job and create a new audit job in the second storage cluster.

7. The computer implemented method of claim 1, further comprising:
   synchronously replicating data of the objects into a third mirrored bucket of the second storage cluster of the distributed storage system.

8. A storage node comprising:
   one or more processing resources; and
   a non-transitory computer-readable medium coupled to the one or more processing resources, having stored therein instructions, which when executed by the one or more processing resources cause the one or more processing resources to:
   store objects each having a unique name in a namespace of a first bucket and files in a file directory of a second bucket of a first storage cluster of the distributed storage system, wherein the objects and files are accessible through an object storage protocol (OSP);
   initiate an OSP audit job on the first storage cluster to manage configuration;
   synchronously replicate OSP audit configuration with a first link from the first storage cluster to the second storage cluster and mirror audit data with a second link from the first storage cluster to the second storage cluster;

perform a switchover process from the first storage cluster to the second storage cluster; and initiate an audit job on the second storage cluster based on the audit configuration during the switchover process, wherein the first storage cluster initially handles input/output operations for a software application before the switchover process.

9. The storage node of claim 8, wherein the instructions when executed by the one or more processing resources cause the one or more processing resources to:

temporarily inactivate the audit job on the first storage cluster based on the switchover process.

10. The storage node of claim 8, wherein the instructions when executed by the one or more processing resources cause the one or more processing resources to:

initiate a switchback process from the second storage cluster to the first storage cluster; and terminate the audit job in the second storage cluster based on the switchback process.

11. The storage node of claim 10, wherein the instructions when executed by the one or more processing resources cause the one or more processing resources to:

proceed with the switchback process including a switchback recovery state for the first storage cluster; and create an auditing job in the first storage cluster if there is none so that after the switchback process completes, the audit job is run in the first storage cluster.

12. The storage node of claim 10, wherein the instructions when executed by the one or more processing resources cause the one or more processing resources to:

abort the switchback process; and for auditing, if previously the switchback process has deleted the audit job in the second storage cluster, then undo the deletion of the audit job and create a new audit job in the second storage cluster.

13. The storage node of claim 8, wherein the instructions when executed by the one or more processing resources cause the one or more processing resources to:

restart the audit job on the first storage cluster based on the switchback process.

14. The storage node of claim 8, wherein the instructions when executed by the one or more processing resources cause the one or more processing resources to:

synchronously replicate data of the objects into a third mirrored bucket of the second storage cluster of the distributed storage system.

15. A non-transitory computer-readable storage medium embodying a set of instructions, which when executed by one or more processing resources of a distributed storage system cause the one or more processing resources to:

store objects each having a unique name in a namespace of a first bucket and files in a file directory of a second bucket of a first storage cluster of the distributed storage system, wherein the objects and files are accessible through an object storage protocol (OSP);

initiate an OSP audit job on the first storage cluster to manage configuration;

synchronously replicate OSP audit configuration with a first link from the first storage cluster to the second storage cluster and mirror audit data with a second link from the first storage cluster to the second storage cluster;

perform a switchover process from the first storage cluster to the second storage cluster; and initiate an audit job on the second storage cluster based on the audit configuration during the switchover process from the first storage cluster, wherein the first storage cluster initially handles input/output operations for a software application before the switchover process.

16. The non-transitory computer-readable storage medium of claim 15, wherein the instructions when executed by the one or more processing resources cause the one or more processing resources to:

temporarily inactivate the audit job on the first storage cluster based on the switchover process.

17. The non-transitory computer-readable storage medium of claim 15, wherein the instructions when executed by the one or more processing resources cause the one or more processing resources to:

initiate a switchback process from the second storage cluster to the first storage cluster; and terminate the audit job in the second storage cluster based on the switchback process.

18. The non-transitory computer-readable storage medium of claim 17, wherein the instructions when executed by the one or more processing resources cause the one or more processing resources to:

restart the audit job on the first storage cluster based on the switchback process.

19. The non-transitory computer-readable storage medium of claim 17, wherein the instructions when executed by the one or more processing resources cause the one or more processing resources to:

proceed with the switchback process including a switchback recovery state for the first storage cluster; and create an auditing job in the first storage cluster if there is none so that after the switchback process completes, the audit job is run in the first storage cluster.

20. The non-transitory computer-readable storage medium of claim 17, wherein the instructions when executed by the one or more processing resources cause the one or more processing resources to:

abort the switchback process; and for auditing, if previously the switchback process has deleted the audit job in the second storage cluster, then undo the deletion of the audit job and create a new audit job in the second storage cluster.

* * * * *